United States Patent
Desai et al.

(10) Patent No.: US 7,299,300 B2
(45) Date of Patent: Nov. 20, 2007

(54) SYSTEM AND METHOD FOR DYNAMICALLY SELECTING A LEVEL OF COMPRESSION FOR DATA TO BE TRANSMITTED

(75) Inventors: Sachin Desai, San Francisco, CA (US); Probal Nandy, Belmont, CA (US); Lawrence Jacobs, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 471 days.

(21) Appl. No.: 10/775,642

(22) Filed: Feb. 10, 2004

(65) Prior Publication Data

US 2005/0188112 A1    Aug. 25, 2005

(51) Int. Cl.
*G06F 15/16* (2006.01)
*H04J 3/18* (2006.01)
(52) U.S. Cl. ..................... 709/247; 370/477
(58) Field of Classification Search ........... 709/247; 370/477
See application file for complete search history.

(56) References Cited

U.S. PATENT DOCUMENTS

| | | | | |
|---|---|---|---|---|
| 5,764,235 | A * | 6/1998 | Hunt et al. | 345/428 |
| 6,505,239 | B1 | 1/2003 | Kobata et al. | 709/208 |
| 6,535,485 | B1 | 3/2003 | Story | 370/231 |
| 2003/0039398 | A1* | 2/2003 | McIntyre | 382/239 |
| 2003/0061356 | A1* | 3/2003 | Jason, Jr. | 709/227 |
| 2004/0010621 | A1* | 1/2004 | Afergan et al. | 709/247 |
| 2005/0086383 | A1* | 4/2005 | Le | 709/247 |
| 2005/0120128 | A1* | 6/2005 | Willes et al. | 709/232 |

FOREIGN PATENT DOCUMENTS

| | | |
|---|---|---|
| GB | 2 367 219 A | 3/2002 |
| GB | 2367219 A * | 3/2002 |

OTHER PUBLICATIONS

"PORT 80 Software"; httpZip Docs Web Page, Online!, Dec. 2003, pp. 1-31, XP002316457, http://web.archive.org/web20031210202711/port80software.com/products/httpzip/docs, p. 4, line 35-p. 5, line 8 and page 7, lines 35-38.*
"PORT 80 Software"; httpZip Docs Web Page, Online!, Dec. 2003, pp. 1-31, XP002316457, http://web.archive.org/web20031210202711/port80software.com/products/httpzip/docs, p. 4, line 35-p. 5, line 8 and page 7, line 35-line 38.

* cited by examiner

*Primary Examiner*—Jason Cardone
*Assistant Examiner*—Brian J Gillis
(74) *Attorney, Agent, or Firm*—Park, Vaughan & Fleming LLP

(57) ABSTRACT

A system and method for dynamically selecting a level of compression to be applied to data to be served to a client. The level of compression may be selected on the basis of one or more factors, such as: the bandwidth of a communication link between the client and a server, the amount of data requested by the client, the workload of the server, whether the data are cacheable, etc. The server can readily obtain information such as the amount of requested data and the available CPU time on the server. To determine the bandwidth, the server may conduct a test transfer of a known amount of data to or from the client, or consult a database identifying known or expected bandwidths for specific client connections (or addresses). Based on the selected factor(s), the server dynamically selects a level of compression for the data.

17 Claims, 2 Drawing Sheets

SYSTEM AND METHOD FOR DYNAMICALLY SELECTING A LEVEL OF COMPRESSION FOR DATA TO BE TRANSMITTED

BACKGROUND

This invention relates generally to the field of computer systems. More particularly, a system and method are provided for dynamically selecting a level or amount of compression to be applied to data to be transmitted from one computer system to another.

When a user or client accesses a web site or otherwise requests data to be transmitted from a server, the data may be transmitted in compressed or raw (i.e., uncompressed) form. If a web page, document or other content is transmitted in raw form, it is typically sent to the client "as is" (e.g., as it is stored on the server). If sent in compressed form, some sort of compression is applied to the content to reduce its size. The advantage with the latter option is that less data needs to be transmitted, thereby taking less time and communication bandwidth to deliver it to the client.

There are various types of (or algorithms for) compression, and different levels for compressing a set of data by different amounts or ratios. Each level of compression has an associated trade-off between the amount of effort and/or time needed to perform the compression versus the size of the compressed data.

Computing devices that serve compressed data to clients often select one type and/or level of compression to apply to all served data that can be compressed. When applied on a large scale (e.g., for the majority of data served to clients), the selected compression may offer a reasonable tradeoff between the effort needed to perform the compression and the size of the resulting data.

However, a great number of individual clients may be ill-served by having their data subjected to the same, static, level of compression selected for all clients. For example, the selected level of compression may be too low for a client that receives data over a dial-up modem connection. Conversely, a user enjoying a high bandwidth connection may be better served with a lower level of compression or no compression at all.

SUMMARY

Therefore, in one embodiment of the invention, a system and methods are provided for dynamically selecting a level of compression to be applied to data to be served to a client from a server. In this embodiment, the level of compression may be selected on the basis of one or more factors, such as: the bandwidth of a communication link between the client and the server, the amount of data requested by the client, the workload of the server, whether the data are cacheable, etc.

The server can readily obtain information such as the amount of requested data and a measure of the available CPU time on the server. To test the client's bandwidth, the server may conduct a test transfer of a known amount of data to or from the client, or may consult a database identifying known or expected bandwidths for specific client connections (or addresses). Based on the selected factor(s), the data server dynamically selects a level of compression for the client's data.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

In one embodiment of the invention, a system and method are provided for dynamically selecting a level of compression (and/or other parameters) for compressing data to be transmitted over a communication link. In one implementation of this embodiment, when a data server or other origin server is about to transmit data to a client, the server dynamically determines whether the data should be compressed and, if so, how much it should be compressed.

The server may consider such factors as the size or amount of data to be transmitted, the bandwidth (or estimated bandwidth) of a communication link the data must transit, how busy or burdened the server is, etc. Based on its consideration of one or more of these factors, the server selects and applies an appropriate level (and possibly type) of compression.

Figure 1:
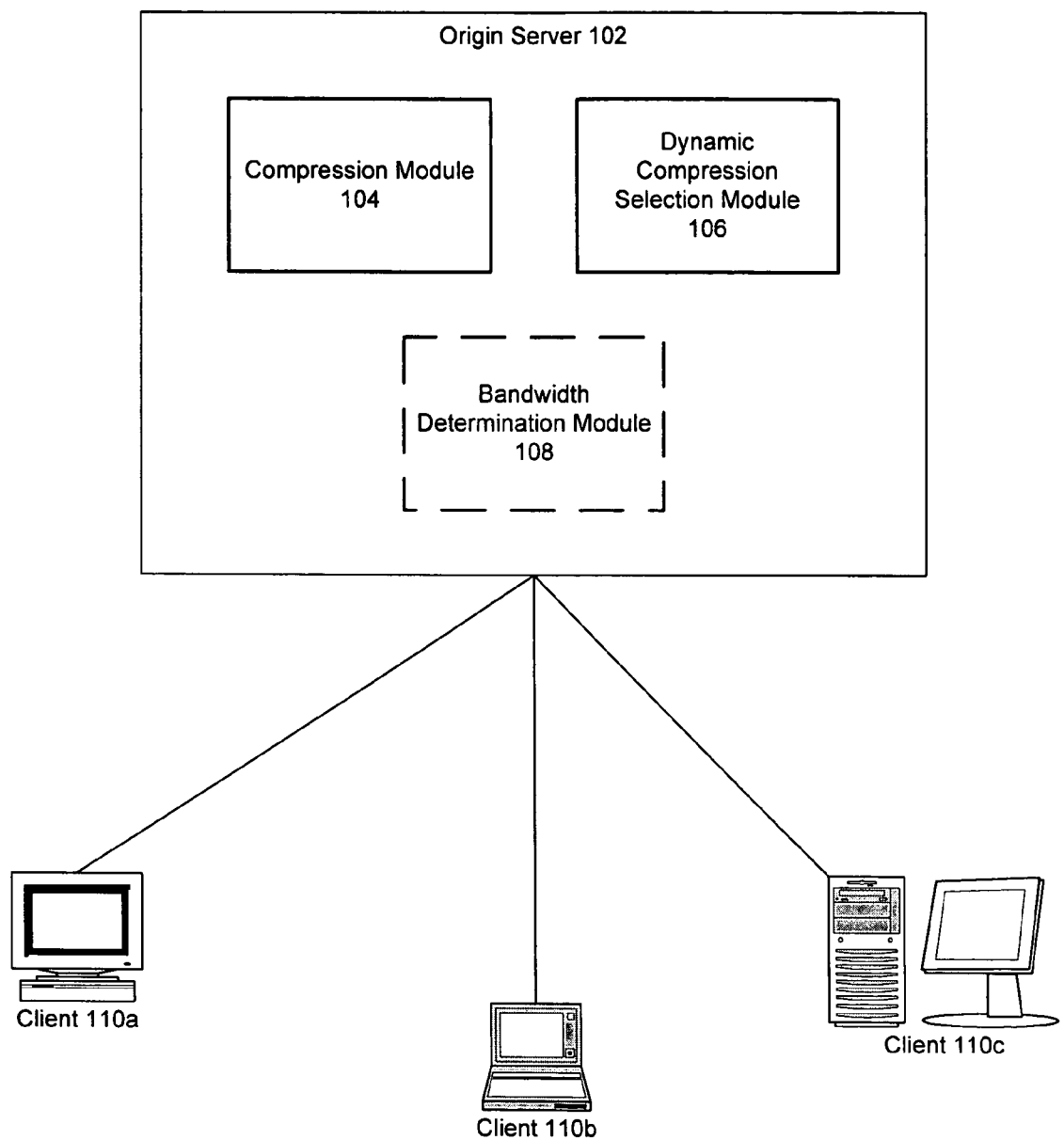
FIG. 1 is a block diagram depicting an illustrative system for dynamically selecting a compression level for data to be transmitted, according to one embodiment of the invention.

FIG. 1 is a block diagram of a computing environment in which an embodiment of the invention may be implemented. In this embodiment, origin server 102 comprises a web server, application server, database, data server, cache and/or other entity or entities for serving data to users, clients, servers and/or other computing devices.

Clients 110a, 110b, 110c are illustrative computing devices that receive data transmitted from origin server 102. Clients may be coupled to origin server 102 via wired and/or wireless communication connections, which may be shared (e.g., a network connection) or dedicated (e.g., a dial-up connection). A client may comprise a browser or other program for requesting, receiving or displaying information.

In the embodiment of FIG. 1, origin server 102 includes compression module 104 and dynamic compression selection module 106, and may also include bandwidth determination module 108. Each module may comprise a separate program or set of executable code, or one program or set of instructions may include any or all of the indicated modules.

Compression module 104 is configured to perform one or more different types of data compression (e.g., different compression algorithms). The compression module is also capable of applying different levels of compression, from level 0 (no compression) to level 10 (maximum compression). In this embodiment of the invention, compression module 104 applies a level (and possibly type) of compression specified by dynamic compression selection module 106.

In one alternative embodiment of the invention, an origin server includes multiple compression modules configured to perform different types and/or levels of data compression.

Dynamic compression selection module 106 is configured to select a level (and/or type) of compression to be applied to data (e.g., web page content, data from a database) to be transmitted to a user, client or other entity. A selection may be made each time data are to be sent to the client or with some other granularity. For example, a selection may be made once for a particular client connection or session, once for each network address that establishes a session or connection with the origin server, or just when a client makes a first connection to the server. Or, a level of compression may be selected on a time basis (e.g., every hour, every day) or other basis (e.g., after a predetermine amount of data has been transmitted to the client). As one skilled in the art will appreciate, the higher the level of compression to be applied to a set of data, the more processing time and memory resources that are consumed.

In an embodiment of the invention, dynamic compression selection module 106 considers various information or criteria when selecting a level of compression. The bandwidth of a communication connection or link between a client and the server may be one such criterion, and may be determined by bandwidth determination module 108. A client's bandwidth may comprise an estimated bandwidth, an actual bandwidth determined during a real-time test, a bandwidth reported by a third-party, etc.

In this embodiment of the invention, dynamic compression selection module 106 may be biased to select lower levels of compression for clients having higher bandwidth, and vice versa. Thus, data to be transmitted to a client having a relatively slow dial-up connection would be compressed more than data to be transmitted to a client having a relative fast DSL (Digital Subscriber Line) or network connection.

Another criterion that may be considered by module 106 when selecting a level of compression is the amount of data to be transmitted. Thus, for greater amounts of data—such as larger or greater numbers of web pages or images—module 106 may be biased to apply greater or stronger compression.

Another criterion is the workload of origin server 102. Thus, the fewer processor cycles the origin server can spare (i.e., the greater the workload or burden on the server), the lower the level of compression that module 106 will attempt to apply. Module 106 may determine or measure criteria such as the amount of data to be transmitted, and the server's workload, directly or indirectly (e.g., through another module of the origin server).

In one embodiment of the invention, dynamic compression selection module 106 is configured to select a compression level by using a chart, graph or other tool correlating specified criteria (e.g., bandwidth, data size) with suitable compression levels. In another embodiment, a compression level is dynamically selected by applying an equation to values for the criteria.

Optional bandwidth determination module 108 is configured to determine a bandwidth associated with, or available on, a client's connection to origin server 102. The bandwidth may be simply estimated or may be derived from an actual measurement (e.g., an instantaneous measurement or an average). In different embodiments of the invention, module 108 may determine a client's bandwidth in different ways. For example, module 108 may initiate or request a transfer of a known amount of data (e.g., a file of a certain size) between the client and the origin server. Or, module 108 may consult a database or other data collection (on origin server 108 or elsewhere) that associates a client (or address) with an actual or estimated bandwidth. As another alternative, module 108 may request the client to identify its estimated, actual or expected bandwidth.

Therefore, in the embodiment of the invention depicted in FIG. 1, origin server 102 applies different levels of compression for different clients, and possibly for different data transmissions to the same client. The selected compression may be applied to specific content being transmitted to a client (e.g., HTML content), or all content being sent.

In one embodiment of the invention, within a set of data served to a client, a server may include JavaScript, a Java applet or other instructions that, when executed, cause the client to transfer a set of data (e.g., a file having a known size) between the server and the client, for the purpose of measuring the bandwidth of the client's connection. The instructions may also be downloaded to the client as a plug-in to a client browser.

In another embodiment of the invention, the level of compression selected for a set of data may be affected by whether or not the data are cacheable. For example, if a set of data (e.g., a web page) to be transmitted by a server is cacheable at a cache between the server and one or more clients, then a higher level of compression may be applied than if the dataset was not cacheable. The higher level of compression will make the resulting data transmission smaller, and thus take up less space when cached.

Figure 2:
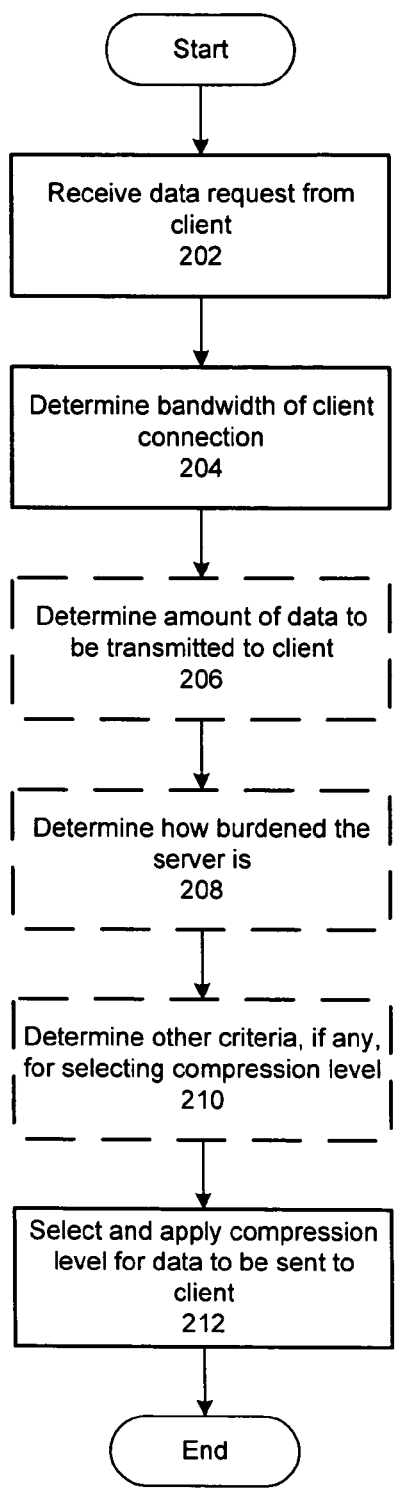
FIG. 2 is a flowchart illustrating one method of dynamically selecting a compression level for data to be transmitted, in accordance with an embodiment of the invention.

FIG. 2 demonstrates one method of dynamically selecting a level of compression to be applied to data to be transmitted to a client or other computing device, according to one embodiment of the invention.

In state 202, a request for data is received at a server. For example, the request may be for a web page or a portion of a web page. The server may receive the request directly from a client or client browser, or may receive the request from a cache that received a request from the client but could not serve the data.

The data request may be the first data request the server has received from the current client or from the client's network address, the first data request of the current client connection, one of multiple data requests from the client, etc.

In state 204, the server determines or identifies a bandwidth associated with or available on a communication link coupling the client to the server. The server may measure the bandwidth directly, by conducting a transfer of data between the client and server for example. Or, the server may obtain a bandwidth measurement from a data collection indicating bandwidths available to different clients or network addresses.

In optional state 206, the server may consider how much data is to be transmitted to the client. This may include all components of a requested web page, just the HTML (Hypertext Markup Language) content that was requested, etc.

In optional state 208, the server may determine how burdened or free a server processor is. This may entail a determination of CPU usage or idle time, a processor throughput time, etc.

In optional state 210, other criteria may be considered by the server. For example, the server may determine whether the requested data are cacheable.

In state 212, the server selects a suitable compression level for the requested data and compresses some or all of the data using that level. The compressed data are then forwarded toward the client or the entity that sent the request to the server (e.g., a cache).

Testing may indicate that one or more particular levels of compression yield better results than others. For example, levels 5 and 6 may offer particularly good trade-offs between the size of the data after compression and the cost of performing the compression.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. An automated method of dynamically selecting a level of compression to be applied to data to be transmitted, the method comprising:

receiving a data request at a server configured to serve data;

identifying a bandwidth associated with a communication link coupling the server to a requestor that originated the data request;

determining an amount of data requested in the data request;

determining how busy the server is;

determining whether the requested data is cacheable at a location between the server and a client;

dynamically selecting a level of compression to apply to the requested data based on the identified bandwidth and whether the data is cacheable at a location between the server and the client, wherein if the data is cacheable, a specified compression level, which is higher than a compression level used for data that is not cacheable, is applied; and compressing the requested data using the selected level of compression.

2. The automated method of claim 1, wherein said identifying comprises transferring a known quantity of data between the server and the requestor.

3. The automated method of claim 1, wherein said identifying comprises retrieving the bandwidth from a database.

4. The automated method of claim 1, wherein said dynamically selecting comprises identifying a level of compression suitable for the bandwidth.

5. A computer readable medium storing instructions that, when executed by a computer, cause the computer to perform a method of dynamically selecting a level of compression to be applied to data to be transmitted, wherein the computer readable medium includes volatile random access memory (RAM), non-volatile read only memory (ROM), and disks, the method comprising:

receiving a data request at a server configured to serve data;

identifying a bandwidth associated with a communication link coupling the server to a requestor that originated the data request;

determining an amount of data requested in the data request;

determining how busy the server is;

determining whether the requested data is cacheable at a location between the server and a client;

dynamically selecting a level of compression to apply to the requested data based on the identified bandwidth and whether the data is cacheable at a location between the server and the client, wherein if the data is cacheable, a specified compression level, which is higher than a compression level used for data that is not cacheable, is applied; and compressing the requested data using the selected level of compression.

6. A computer-implemented method of dynamically selecting a level of compression to apply to a set of data, the computer-implemented method comprising:

receiving from a client a request for a set of data;

determining a bandwidth available on a communication link used by the client;

determining whether the set of data is cacheable at a location between a server and a client;

based on the determined bandwidth and whether the set of data is cacheable at a location between the server and the client, dynamically selecting a level of compression to apply to the set of data, wherein if the set of data is cacheable, a specified compression level, which is higher than a compression level used for data that is not cacheable, is applied; and compressing the set of data using the selected level of compression prior to transmitting the set of data toward the client.

7. The computer-implemented method of claim 6, wherein the dynamically selected level of compression is inversely proportional to the determined bandwidth.

8. The computer-implemented method of claim 6, further comprising:

determining whether the set of data is cacheable;

wherein a higher level of compression is dynamically selected if the set of data is cacheable than if the set of data is not cacheable.

9. The computer-implemented method of claim 8, wherein said determining comprises:

transferring to the client a data object having a known size; and measuring an amount of time required for the transfer.

10. The computer-implemented method of claim 8, wherein said determining comprises:

using an identity of the client, retrieving from a data collection a bandwidth associated with the identity.

11. A computer readable medium storing instructions that, when executed by a computer, cause the computer to perform a method of dynamically selecting a level of compression to apply to a set of data, wherein the computer readable medium includes volatile random access memory (RAM), non-volatile read only memory (ROM), and disks, the method comprising:

receiving from a client a request for a set of data;

determining a bandwidth available on a communication link used by the client;

determining whether the set of data is cacheable at a location between a server and a client;

based on the determined bandwidth and whether the set of data is cacheable at a location between the server and a client, dynamically selecting a level of compression to apply to the set of data, wherein if the set of data is cacheable, a specified compression level, which is higher than a compression level used for data that is not cacheable, is applied; and compressing the set of data using the selected level of compression prior to transmitting the set of data toward the client.

12. An apparatus for dynamically selecting a level of compression to be applied to data to be transmitted from the apparatus, comprising:

a compression module configured to compress, with a specified level of compression, a set of data to be transmitted to a data requestor; and a dynamic compression selection module configured to dynamically select said level of compression based on a bandwidth associated with a communication link employed by the data requestor and based on whether the data is cacheable at a location between a the server and a client, wherein if the data is cacheable, a specified compression level, which is higher than a compression level used for data that is not cacheable, is applied.

13. The apparatus of claim 12, further comprising:

a bandwidth determination module configured to determine the bandwidth of a communication link used by the data requestor.

14. The apparatus of claim 13, wherein said bandwidth determination module is configured to calculate the bandwidth by transferring a known quantity of data between the data requestor and the apparatus.

15. The apparatus of claim 13, wherein said bandwidth determination module is configured to retrieve the bandwidth from a database configured to identify bandwidths associated with data requestors' communication links.

16. The apparatus of claim 12, wherein the apparatus is configured to determine a size of the set of data.

17. The apparatus of claim 12, wherein the apparatus is configured to determine whether the set of data is cacheable.

* * * * *

UNITED STATES PATENT AND TRADEMARK OFFICE
CERTIFICATE OF CORRECTION

| | |
|---|---|
| PATENT NO. | : 7,299,300 B2 |
| APPLICATION NO. | : 10/775642 |
| DATED | : November 20, 2007 |
| INVENTOR(S) | : Desai et al. |

It is certified that error appears in the above-identified patent and that said Letters Patent is hereby corrected as shown below:

In column 7, line 19, in Claim 12, before "server" delete "the".

Signed and Sealed this

Twenty-first Day of October, 2008

JON W. DUDAS
*Director of the United States Patent and Trademark Office*